United States Patent [19]

Bixler et al.

[11] Patent Number: 4,756,750
[45] Date of Patent: Jul. 12, 1988

[54] PROCESS FOR THE DIRECT REDUCTION OF IRON ORE

[75] Inventors: Arthur D. Bixler, Washington Township, Lehigh County; Tarun D. Vakil, Macungie; Shoou-I Wang, Allentown, all of Pa.

[73] Assignee: Air Products and Chemicals, Inc., Allentown, Pa.

[21] Appl. No.: 43,118

[22] Filed: Apr. 27, 1987

[51] Int. Cl.[4] ............................................. C21B 13/02
[52] U.S. Cl. ............................................. 75/35; 75/91
[58] Field of Search .......................... 75/34, 35, 90, 91

[56] References Cited

U.S. PATENT DOCUMENTS

| | | | |
|---|---|---|---|
| 3,423,201 | 1/1969 | Celada et al. | 75/35 |
| 3,764,123 | 10/1973 | Beggs et al. | 266/29 |
| 3,828,474 | 8/1974 | Quartulli | 48/214 |
| 4,439,233 | 3/1984 | Faccone | 75/35 |
| 4,536,213 | 8/1985 | Sanzenbacher | 75/35 |

FOREIGN PATENT DOCUMENTS

| | | |
|---|---|---|
| 1270071 | 4/1972 | United Kingdom . |
| 1398078 | 6/1975 | United Kingdom . |
| 1569014 | 6/1980 | United Kingdom . |
| 2153383 | 8/1985 | United Kingdom . |

OTHER PUBLICATIONS

E. Supp, "Convert Methanol Economically", *Hydrocarbon Processing*, Jul. 1984.
R. Lawrence, "Direct Reduction Strikes While the Iron is Hot", *Chemical Engineering*, 2/22/71.

*Primary Examiner*—Melvyn J. Andrews
*Attorney, Agent, or Firm*—Willard Jones; James C. Simmons; William F. Marsh

[57] ABSTRACT

An energy efficient process for the direct reduction of iron ore is disclosed. The process utilizes a combination of primary steam methane reforming and secondary (autothermal) reforming, along with the use of oxygen for soot generation to achieve a greater than 11 percent reduction in the energy requirement to produce sponge iron from iron ore.

2 Claims, 3 Drawing Sheets

PROCESS FOR THE DIRECT REDUCTION OF IRON ORE

TECHNICAL FIELD

The present invention relates to a process for the direct reduction of iron ore using a reducing gas comprising a mixture of hydrogen and carbon monoxide.

BACKGROUND OF THE PRIOR ART

The direct reduction of iron ore requires the production of a synthesis gas or reducing gas containing hydrogen and carbon monoxide for reaction with the iron ore in the shaft furnace. Numerous processes have been used or proposed for the production of a synthesis gas containing hydrogen and carbon monoxide. Among these processes are the following.

U.S. Pat. No. 3,828,474 discloses a process for the production of a high strength reducing gas suitable for reducing metallic ores such as iron ore. The process disclosed is a multi-step process using a $C_3$ to $C_{15}$ hydrocarbon such as liquid naphtha as the starting material. The first step of the process disclosed comprises gasifying the hydrocarbon by passing a preheated mixture of the hydrocarbon and steam through a bed of a reforming catalyst to produce a gas consisting essentially of methane, hydrogen, carbon oxides and steam. Carbon dioxide is removed from this gas mixture and the resulting gas is further reformed in the presence of a reforming catalyst to produce a gas comprising hydrogen and carbon monoxide.

U.K. Pat. No. 1,270,071 discloses a process for the production of a reducing gas. In the process disclosed, a steam reforming effluent having a total concentration of carbon monoxide and hydrogen of at least 80 mole percent is produced by effecting the steam reforming in at least two zones, with a portion of the hydrocarbon feed being introduced into the first zone and the remaining portion of the hydrocarbon feed being introduced into the subsequent zone(s). Also in the process, the effluent of each zone, including the first zone, is admixed with the portion of the feed to be introduced into the subsequent zone for the completion of the steam reforming. The temperature of the mixing is regulated such that the temperature of the mixture being introduced into the subsequent zone(s) is at least 1200° F. The steam requirements are regulated to provide a steam to carbon ratio into the second and subsequent zone(s) of less than 2:1 and a steam to carbon ratio for the first zone of at least 2:1. A similar process is disclosed in a German article by H. Jockel et al entitled: "Manufacture of Reduction Gas for Ore Smelting by Two-Stage Catalytic Steam Reforming of Natural Gas" (Abstract in English).

U.K. Pat. No. 1,398,078 discloses a process for producing a reducing gas by reforming a hydrocarbon feedstock in a first stage with an excess of steam in a catalyst bed externally heated in a furnace to give a reformer gas containing carbon oxides, hydrogen, unreacted steam, and possibly hydrocarbons, cooling the reformer gas, condensing and removing at least a portion of the unreacted steam. In the second stage, reheating the dried reformer gas to a temperature in the range of 750°–1100° C. and reacting the carbon dioxide and the steam in the gas with any hydrocarbons contained therein or added thereto.

U.K. Pat. No. 1,569,014 discloses a process for producing a synthesis gas by first desulfurizing and dividing into two fractions a hydrocarbon feedstock. The first fraction undergoes a primary steam reforming reaction at high pressure and mild temperature. The gas effluent from said reaction, as well as the second fraction of the feedstock, subsequently undergo jointly a secondary reforming reaction in an adiabatic reactor, by reacting with an oxygen containing gas. A similar process is proposed in an article by E. Supp in the July 1984 issue of *Hydrocarbon Processing* entitled "Convert Methanol Economically".

U.K. Pat. Appln. No. 2,153,383A discloses a process for producing a reducing gas having a high reduction potential. In the process, the reducing gas is prepared by catalytic conversion in two steps of a sulfur-free gas mixture of hydrocarbons having a high content of hydrocarbons with two or more carbon atoms. In the first step of the process, an inlet stream of at least a part of the gas mixture together with added steam is passed through an adiabatic reactor containing a steam reforming catalyst at an inlet temperature of 400°–550° C. and an outlet temperature of 400°–500° C. and at a pressure of 1–30 kg/cm$^2$g, the amount of steam added being calculated for obtaining in the inlet stream an H/C ratio of at least 4.8 and an O/C ratio of between 0.5 and 1. The outlet stream from the first step is combined with the top-gas from a reduction furnace, and the combined stream in then further converted in a second step by steam reforming.

As with reducing gas production processes, there are numerous process configurations which are in use or have been proposed for the direct reduction of iron ore. Patent and publications which are representative of these are U.S. Pat. Nos. 4,439,233; 3,764,123 and 3,423,201 and and article by Robert Lawrence in the Feb. 22, 1971 edition of *Chemical Engineering* entitled "Direct Reduction Strikes While the Iron is Hot".

SUMMARY OF THE INVENTION

The present invention relates to a process for the direct production of iron ore to produce sponge iron in which a first essentially sulfur-free natural gas stream is reformed with steam in a steam-methane type primary reformer to produce a primary reformer effluent high in hydrogen and carbon monoxide. The steam to total carbon ratio entering the reformer is maintained at an effective level so as to prevent the formation of carbon; the preferred ratio is about 1.3. The primary reformer effluent is further reformed along with a second essentially sulfur-free natural gas stream and an oxygen stream in a oxygen type secondary reformer. This secondary reforming produces a secondary reformer effluent having an "R" value of greater than 9.5 and a $H_2+CO$ concentration of at least 80 mole percent. A hydrocarbon stream is partially oxidized with an oxygen stream to produce soot and a soot generator off-gas stream.

The secondary reformer effluent is combined with the soot, the soot generator off-gas stream and an essentially $CO_2$-free shaft furnace recycle stream to produce a total reducing gas stream. This total reducing gas is contacted countercurrently with a descending bed of iron ore in a shaft furnace. During this contacting operation, the iron ore is reduced producing sponge iron and the reducing gas is substantially converted to water ($H_2O$) and carbon dioxide ($CO_2$) and removed as a shaft furnace off-gas. The shaft furnace off-gas is then cooled thereby condensing out a major portion of the formed water. This condensed water is then removed from the shaft furnace off-gas stream.

A portion of the shaft furnace off-gas is purged to maintain a low level of impurities in the shaft furnace recycle stream. The remainder of the shaft furnace off-gas is compressed; this compressed shaft furnace off-gas is then processed to remove $CO_2$, thus producing an essentially $CO_2$-free shaft furnace recycle stream. This essentially $CO_2$-free recycle stream is heated and recycled to the shaft furnace as part of the total reducing gas.

DETAILED DESCRIPTION OF THE INVENTION

Figure 1:
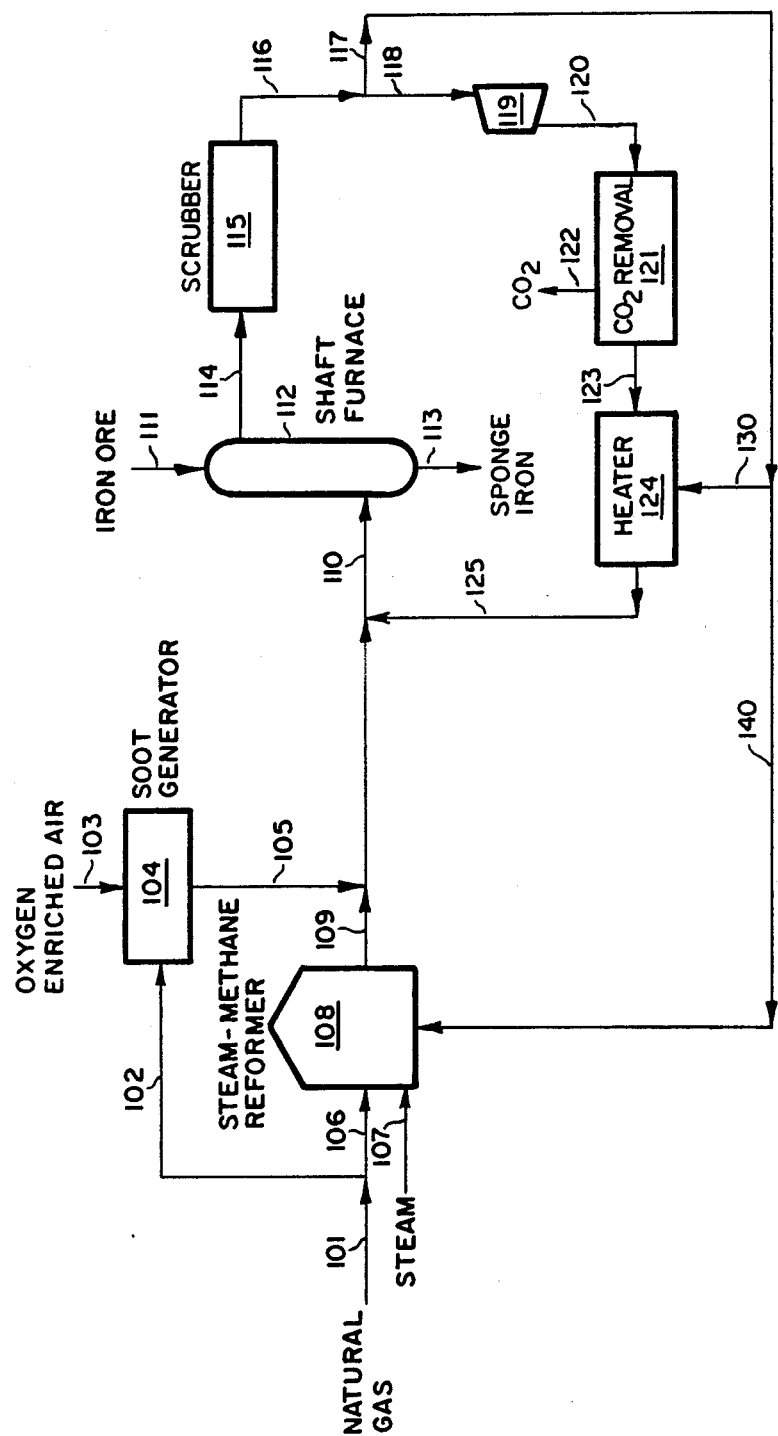
FIG. 1 shows a conventional direct reduction process with a $CO_2$ removal system.

Direct reduction (DR) processes produce metals from their ores by removing associated oxygen at temperatures below the melting temperature of any of the materials involved in the process. Products from the DR process of iron ore is referred to as direct-reduced iron. The reduction of iron ore in any direct reduction process is accomplished by the same reactions that occur in a blast furnace, including reduction by the reducing agents carbon monoxide (CO) and hydrogen ($H_2$), and in some cases solid carbon, through successive oxidation states to metallic iron. When the reduction reactions are carried out below about 1000° C., the reducing agents usually are restricted to CO and $H_2$.

Various processing schemes have been developed for generation of a high strength reducing syngas, containing a high concentration of $H_2$ and CO, for the direct reduction of iron (DRI) process and other processes. In these schemes, natural gas or other carbonaceous material is steam reformed at various pressures and steam ratios into CO and $H_2$. It is well known that to obtain a high strength reducing gas without any cooling of the reformed gas product or without removal of carbon dioxide ($CO_2$) it is necessary to operate the reformer at a low ratio of steam per atom of carbon in the feed, otherwise known as the steam-carbon ratio. For instance, in the case of methane or natural gas, the reaction proceeds according to the following equation:

$$CH_4 + H_2O \rightarrow CO + 3H_2 \quad (1)$$

The stoichiometric requirement of steam per carbon atom for the above equation is 1.0. However, other reactions can occur within the reformer such as the carbon monoxide disproportionation reaction

$$2CO \rightarrow CO_2 + C \quad (2)$$

and the cracking reaction:

$$CH_4 \rightarrow C + 2H_2 \quad (3)$$

Reactions (2) and (3) are associated with deposition of carbon on the catalyst which in turn causes deactivation of catalyst and, in extreme cases, plugging of the catalyst bed. To avoid carbon deposition it is necessary to introduce large amounts of steam if a low activity reforming catalyst is used, or to increase the steam-carbon ratio slightly above the stoichiometric level if a high activity reforming catalyst is used. In the former case steam-carbon ratios of from 2 to 3 to 1 are required depending on operating conditions. In the latter case, it is possible to operate the reformer at a relatively low steam-carbon ratio.

To obtain a high strength reducing gas from the reformer, it is desirable to maintain low levels of both steam and $CO_2$ in the inlet stream to the reformer. The basic reason for reduced ($H_2$+CO) content of the reducing gas is the diluent effect of the additional reforming steam and of the associated $CO_2$ produced in the reforming operation and recycled. While removal of steam from the reformer effluent would yield a high strength reducing gas, such a step would be uneconomic because it would be necessary to cool the reformer effluent for water condensation and removal after which it would have to be reheated prior to introduction into the iron ore reduction facility. Cooling and reheating requires costly heat exchange equipment and associated large high temperature piping which would make the process unattractive. In addition, the water condensation step increases pressure drop and, thus, requires that the reformer operation be carried out at much higher pressure necessitating an increase in either the operating temperature or the steam-carbon ratio, or both, in order to meet the residual methane requirement.

The mole ratio ($H_2$+CO/$H_2O$+$CO_2$) of a gas mixture is commonly referred to by the term "reducing ratio" or "R" value. The reducing ratio is a measure of the efficiency of a gas mixture when used as a reductant; the higher the reducing ratio the greater the efficiency.

Current schemes for producing high strength reducing gas need to be improved for energy efficiency and reduced product cost. These processing schemes were evolved over the past two decades and represent the process optimization efforts by the industry thus far.

Two alternative process schemes, one with and one without a $CO_2$ removal system, are commercially available for such application. These schemes are shown in FIGS. 1 and 2, respectively.

Figure 2:
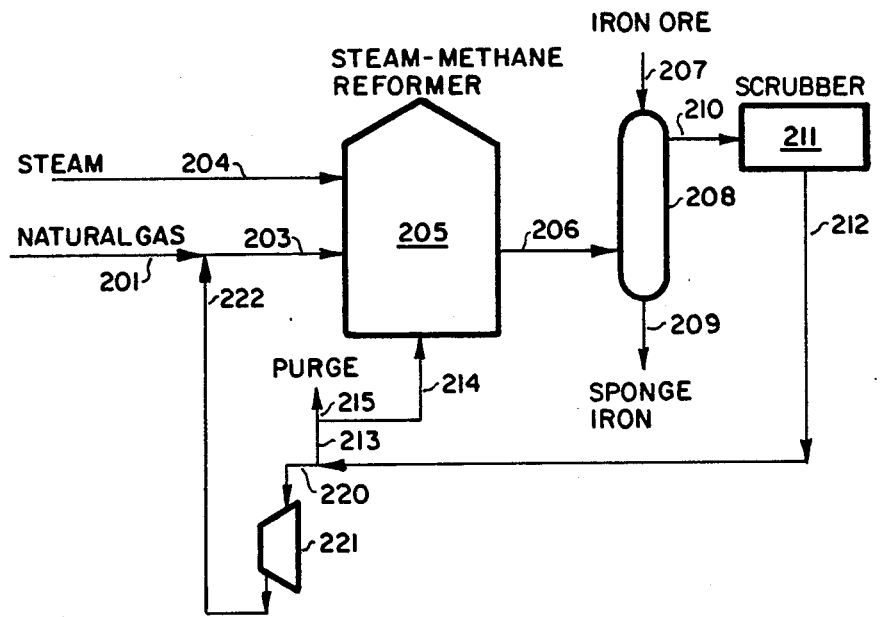
FIG. 2 shows a conventional direct reduction process without a $CO_2$ removal system.

A conventional direct reduction process with $CO_2$ removal is shown in FIG. 1 and comprises primary steam reformer 108, soot generator 104, shaft furnace 112, Venturi scrubber 115, compressor 119, $CO_2$ removal unit 121 and recycle gas preheat furnace 124. In the process, as depicted in FIG. 1, natural gas stream 101 is split into two portions, first portion 102 and second portion 106. First portion 102 is fed to soot generator 104 along with enriched air in stream 103. The ratio of oxygen enriched air in stream 103 to natural gas in stream 102 is selected so as to provide about 60% of the stoichiometric requirement of oxygen to fully combust the natural gas in stream 102. The combustion product from soot generator which includes soot required for the direct reduction of iron is removed in stream 105.

Second portion 106 and steam stream 107 are fed to steam-methane reformer 108 for conversion to a syngas rich in hydrogen and carbon monoxide; this syngas stream is removed via line 109. To provide the heat energy needed for the conversion to syngas, purge stream 140 is combusted in steam-methane reformer 108.

The combustion product of soot generator 104 in line 105, the syngas in line 109 and compressed, heated, $CO_2$-lean, recycle shaft furnace off-gas in line 125 are united into a combined furnace gas feed stream and fed to shaft furnace 112 via line 110. In shaft furnace 112, iron ore, which has been fed to the furnace via line 111 is countercurrently contacted with the combined furnace gas feed stream resulting in the production of sponge iron, which is removed from shaft furnace 112, via line 113. The spent furnace gas stream is removed as an effluent stream via line 114.

The effluent stream 114 from shaft furnace 112 is scrubbed of dust and cooled in Venturi scrubber 115 resulting in cooled scrubbed off-gas stream 116.

A portion of cooled scrubbed off-gas stream 116 is removed via line 117 as a purge to limit the level of inerts within the system. All or a portion of purge stream 117 is utilized as fuel gas for providing heat requirements for the system. As shown, purge gas stream can be split into two substreams, streams 130 and 140, respectively. Purge stream 130 can be combusted in heater 124 to provide heat for the recycle gas in stream 123 and purge stream 140 can be fed to steam-methane reformer as noted above. All other heat requirement could be met by burning natural gas.

The remaining portion, in line 118, of the cooled scrubbed off-gas stream 116 is fed to and compressed in compressor 119. This compressed stream in line 120 is fed to $CO_2$ removal unit 121 where $CO_2$ is removed from the recycle stream via line 122. $CO_2$-free recycle gas in line 123 is then preheated in heater 124 and recycled to shaft furnace 112, via line 125.

The alternative process for reducing gas generation without a $CO_2$ removal system is shown in FIG. 2. This process reforms natural gas with a recycle stream rich in $CO_2$ and water vapor to produce $H_2$ and CO. In this alternative process without $CO_2$ removal, the SMR and associated equipment must be increased in size and the purge rate must be increased to stabilize carbon levels within the plant. With reference to FIG. 2, a natural gas feed stream 201 is united with a compressed recycle stream to form feed gas stream 203. Feed gas stream 203 along with steam in stream 204 is fed to steam-methane reformer 205 wherein it is converted to syngas which is removed from steam-methane reformer 205, via line 206.

Syngas stream 206 is then fed to shaft furnace 208 wherein it passes countercurrently through the descending bed of iron ore, which was fed via line 207. Sponge iron is removed from shaft furnace 208, via line 209. Effluent gas stream 210 from the shaft furnace 208 is then scrubbed of dust and cooled in Venturi scrubber 211. A portion of the cooled scrubbed gas 212 is purged via line 213 to control the level of water and carbon dioxide in the system. All or a portion of purge stream 213 is utilized as fuel gas for furnaces within the system while the balance of the plant fuel requirements are met by natural gas. As shown, a portion of purge stream 213 can be fed, via line 214, to steam-methane reformer 205 for providing heat energy, the remaining portion can be vented to the atmosphere or a flare via line 215.

The remaining portion of cooled effluent stream 212, can be fed via line 220 and compressed in compressor 221, prior to being recycled back as steam-methane reformer feed in line 222.

Figure 3:
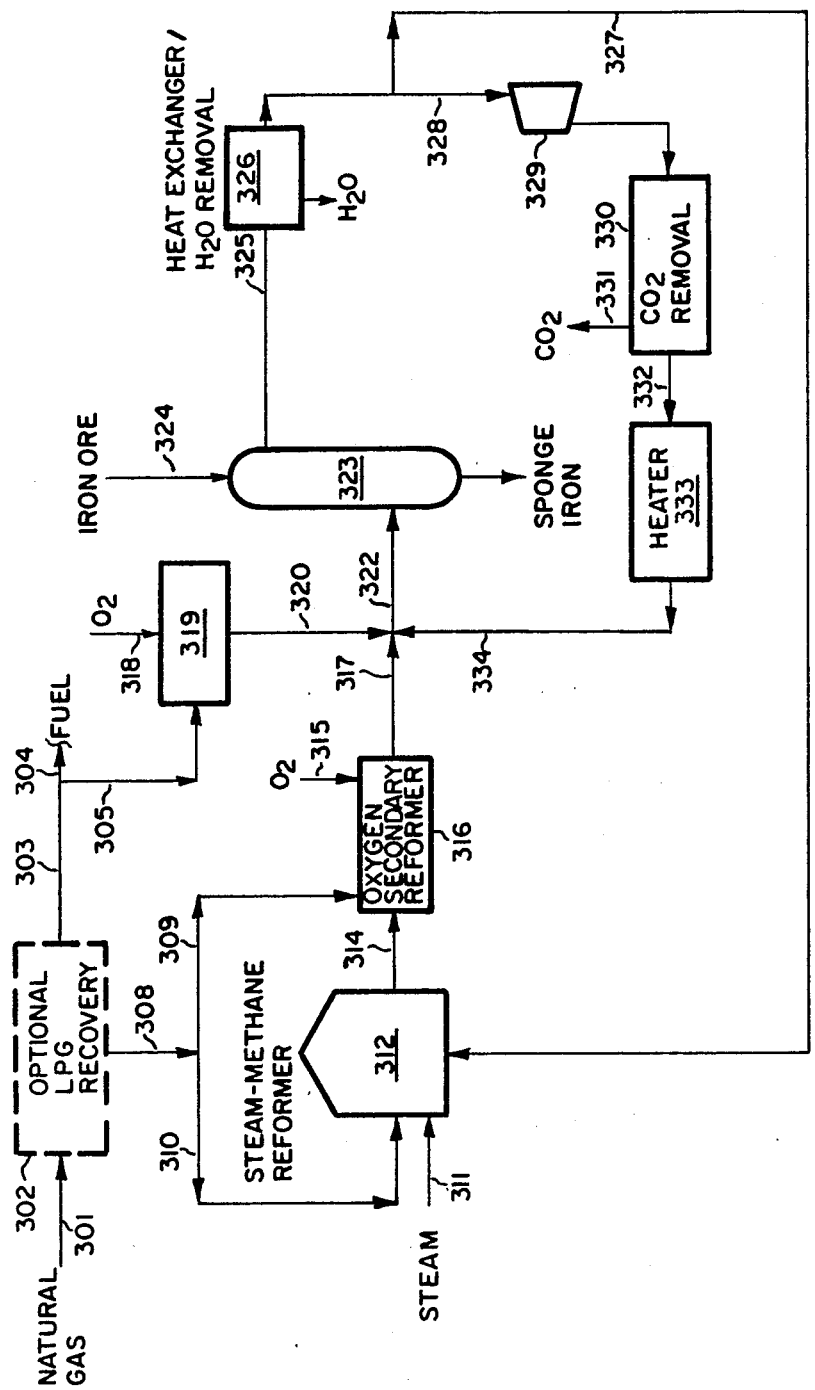
FIG. 3 shows the direct reduction process according to the present invention.

As shown in FIG. 3, the process of the present invention comprises a primary steam-methane reformer (SMR) and a secondary oxygen reformer followed by recycle gas and soot mixing to comprise the reducing gas feed stream for the shaft furnace. The shaft furnace is followed by a recycle gas heat recovery system, gas cooling, compression, $CO_2$ removal and a fired heater.

Although individual process features or steps of the present invention are perhaps known, no prior art have heretofore been aware of or appreciated the significant advance in the art to be associated with the process of the present invention, and its combination and sequential arrangement of process steps.

Referring to FIG. 3, crude natural gas feed, in line 301, is optionally processed in heavy hydrocarbon removal unit 302 (LPG Recovery) to separate $C_3$ and heavier hydrocarbons from the feed natural gas. The recovered heavy hydrocarbons, in line 303, are used for soot generation, in line 305, and as plant fuel, in line 304, whereas the cleaned natural gas, in line 308, is reformed to produce a reducing gas.

At least a portion of the $C_3$ and heavier hydrocarbons from LPG Recovery unit 302 is fed, via line 305, along with substoichiometric amount of oxygen in line 318 to soot generator 319 to produce combustion products and soot.

The reforming scheme of the present invention consists of primary steam-methane reformer 312 in series with secondary oxygen reformer 316 with feed natural gas bypass to the secondary. Thus, the cleaned natural gas in line 308 from the hydrocarbon removal unit 302 is split in two; a first portion is fed, via line 310, to primary reformer 312, while the second portion is diverted, via line 309, to secondary reformer 316. The cleaned natural gas feed to the primary reformer, in line 310, is desulfurized (not shown), mixed with appropriate amount of steam, introduced into the process via line 311, to achieve a "steam to carbon" ratio of 1.3, and then preheated to 900° F. prior to being introduced into primary reformer 312. The effluent of the primary reformer, in line 314, along with bypass clean natural gas feed, in line 309, and oxygen, in line 315, are fed to secondary oxygen reformer 316. The amount of bypass clean natural gas to secondary, in line 309, is adjusted so as to achieve a "steam to carbon" ratio of about 0.6 in the feed gas to secondary reformer 316. The oxygen flow to the secondary reformer, in line 315, is adjusted so as to achieve about 1750° F. temperature in secondary reformer effluent, line 317.

The soot generator effluent, line 320, the secondary reformer effluent, line 317, and the recycle gas from the shaft furnace (where iron ore reduction occurs) after $CO_2$ removal, line 334, are mixed together to constitute the total reducing gas feed to the shaft furnace. This feed, in line 322, has a minimum temperature of 1562° F. and a minimum "R" value (defined as moles of $H_2+CO$ divided by moles of $H_2O+CO_2$) of 9.5. Also the ($H_2+CO$) mole % in stream 322 is 80% or higher. The total reducing gas stream, in line 322, and iron ore, in line 324, are contacted countercurrently in shaft furnace 323.

The shaft furnace effluent gas, line 325, is cleaned of dust, cooled and reduced in water content in heat exchanger/water removal unit 326. A portion of the shaft furnace effluent can be removed and fed, via line 327, to the burners of steam-reformer 312 to provide a portion of the energy necessary for the steam-reforming process. The amount of shaft furnace effluent gas removed via line 327 prior to compression is selected in order to maintain the "inerts" balance. Sources of inerts are the crude natural gas and the oxygen for soot generation and secondary reforming.

The remaining portion, in line 328, is compressed in compressor 329 prior to routing it to $CO_2$ removal system 330. The $CO_2$ free recycle gas, in line 332, is cooled to remove water and then preheated to 1562° F. in heater 333 prior to blending it via line 334 with the make-up reducing gas from the secondary reformer. Heat recovery systems are provided to recover process heat from the primary reformer convection section as well as the shaft furnace effluent gas stream. The purge gas, line 327, and the residual recovered hydrocarbons, line 304, are used as plant fuel for the primary reformer furnace. The balance of the process fuel requirements are met by firing crude natural gas as fuel.

This process scheme is based on using natural gas as the process raw material. The heavy hydrocarbon separator 302 is optional, required only when the crude natural gas feed contains appreciable amounts of $C_3$ and heavier hydrocarbons.

As for the operating conditions for the above described process, the feed to primary steam-methane reformer 312 is composed of cleaned natural gas in line 310 and steam. The ratio of steam to organic carbon should be maintained at an effective amount to prevent the formation of carbon in the reformer. Generally, this effective amount is a stoichiometric excess of steam; for the present process, this ratio is about 1.3:1. Primary steam-methane reformer 312 operates at the effluent conditions of 75 psia pressure and 1650° F. temperature. Primary reformer 312 operating pressure is partly dictated by the operating pressure of the shaft furnace and the pressure drop within the process piping and equipment. Primary reformer 312 effluent temperature is dictated by the reformer tube metallurgy.

Secondary oxygen reformer feed consists of primary reformer effluent (stream 314), oxygen (stream 315) and bypass feed natural gas (stream 309); the ratio of residual steam in primary effluent to total organic carbon entering secondary reformer 316 is controlled at 0.6 by manipulating the split of the total feed natural gas stream 308 into stream 310 to primary reformer 312 and stream 309 to secondary reformer 316. The flow of oxygen to secondary is controlled such that the secondary effluent is at about 1750° F. The oxygen secondary reformer operates at about 72-75 psia pressure.

The soot generator effluent temperature is about 2370° F. and it uses 99.5% pure $O_2$. The operating pressure is about 75 to 85 psia.

The combined feed to the shaft furnace, line 322, is at 69 psia, 1580° F. and has a "R" value of 15.6. The $(H_2+CO)$ is 91.8 mole %. The minimum requirements as dictated by the shaft furnace operation are R=9.5, temperature=1562° F., and $(H_2+CO)=80$ mole %.

The $CO_2$ removal system 330 reduces the $CO_2$ level in the effluent gas to about 1%. The $CO_2$ system operates at about 100 to 105 psia.

The $CO_2$ free recycle gas, in line 332, could be preheated from 158° F. to 270° F. in a process gas heat exchanger and further heated to 1562° F. in a fired preheater.

A typical set of stream flow rates and compositions for selected key streams are given in Table 1.

TABLE 1

Flows and Compositions for Selected Key Streams
Basis: 1543.5 short tons/day of reduced iron product

| | Stream No. | | | | | | | | | | | | |
|---|---|---|---|---|---|---|---|---|---|---|---|---|---|
| | 301 | 305 | 309 | 310 | 314 | 315 | 317 | 318 | 320 | 322 | 325 | 328 | 332 |
| T, °F. | 113 | 700 | 95 | 95 | 1650 | 100 | 1755 | 100 | 2373 | 1581 | 750 | 110 | 110 |
| P, psia | 584 | 90 | 140 | 140 | 76 | 90 | 74 | 84 | 74 | 69 | 57 | 50 | 100 |
| Vapor Conc. (mole %) | | | | | | | | | | | | | |
| $H_2$ | | | | | 66 | | 63 | | 63 | 68 | 44 | 60 | 72 |
| $H_2O$ | | | | | 8 | | 7 | | 10 | 4 | 29 | 3 | 1 |
| CO | | | | | 22 | | 27 | | 26 | 24 | 13 | 18 | 22 |
| $CO_2$ | 6 | | 7 | 7 | 2 | | 2 | | 1 | 2 | 12 | 16 | 1 |
| $C_1$ | 79 | | 82 | 82 | 2 | | 1 | | trace | 2 | 2 | 3 | 4 |
| $C_2$ | 7 | 1 | 8 | 8 | | | | | | | | | |
| $C_3$ | 5 | 46 | 3 | 3 | | | | | | | | | |
| $C_4$ | 2 | 36 | trace | trace | | | | | | | | | |
| $C_5$ | 1 | 11 | trace | trace | | | | | | | | | |
| $C_6$ | trace | 6 | trace | trace | | | | | | | | | |
| $N_2$ + Ar | trace | trace | trace | trace | trace | 0.5 | trace | 0.5 | trace | trace | trace | trace | trace |
| $O_2$ | trace | trace | trace | trace | | 99.5 | | 99.5 | | | | | |
| Flow: mol/hr | 1076 | 27 | 412 | 618 | 2757 | 270 | 4149 | 34 | 182 | 8988 | 8898 | 5674 | 4758 |
| Mol Weight | 21.47 | 54.48 | 19.99 | 19.99 | 10.20 | 31.98 | 10.95 | 31.98 | 11.02 | 9.98 | 15.30 | 14.31 | 9.07 |
| Carbon: lb/hr | | | | | | | | | 609 | | | | |

The process of the present invention produces a high strength syngas (mixture of $H_2+CO$) which could be used in a variety of applications. Specifically, the process as shown in FIG. 3 will generate sufficient makeup reducing gas and combine it with the recycle gas to comprise the total shaft furnace feed gas of the required quality.

The improved process combines a number of features and incorporates them into a conventional process for generating reducing gas. These features include a combination of primary steam-methane reforming and secondary oxygen (autothermal) reforming and an optimization of gas recycle, purge and process flows and conditions. The improved processing scheme as shown in FIG. 3 is lower in both capital and operating cost than the conventional process. The improved process is useful in applications other than the DRI process where a high strength syngas is desired, such as the manufacture of pure CO or oxoalcohols.

Steam-methane reforming (SMR) technology is used to produce reducing gas for use in the shaft furnace of a DRI process. The required conditions at the shaft furnace inlet, as dictated by the conventional DRI process, are 1560° F. minimum temperature and greater than 80% $(H_2+CO)$ concentration, while higher temperatures and greater concentrations are desirable.

FIG. 3 shows several improvements to the conventional process for reducing gas generation. The novel feature of the improved processing scheme of FIG. 3 lies in the combined use of five basic features.

The customary SMR effluent temperature for such reducing gas generation processes is limited to 1616° F. based on tube metallurgy considerations. Based on our operating experience, the improved process of the present invention uses a 1650° F. SMR operating temperature limit without damage to standard tubes. The resultant increased temperature entering the shaft furnace results in correspondingly higher percentage gas utilization in the shaft furnace which in turn reduces the gas recycle system sizing.

(a) Use of an autothermal/secondary oxygen reformer operating in series with a primary reformer and processing the effluent from the primary reformer along with additional feed natural gas. The secondary oxygen reformer effluent is expected to be in the range of 1800° F. which provides opportunity for operating the primary reformer at a lower temperature such that the reducing gas effluent from the combined primary/secondary system meets the 1616° F. minimum requirement. This may afford savings in reformer tube metallurgy.

Alternately, the primary reformer can be operated at the normal temperatures thereby increasing the temperature of the shaft furnace feed gas or reducing oxygen consumption in the secondary reformer for a given secondary effluent temperature. The combined primary/secondary system effluent is expected to be at a higher temperature having a higher "R" value than the effluent from a stand-alone primary reformer. Higher temperature and higher "R" value of the reducing gas affords greater gas utilization per pass in the shaft furnace thereby requiring a smaller recycle system. Further, splitting the feed natural gas between primary and secondary reformers yields an overall primary/secondary system that is more cost effective than a stand-alone primary. Additionally, by mixing natural gas with the primary reformer effluent at a temperature where carbon removal is faster than carbon formation, a higher "R" value reducing gas can be generated because less steam needs to be provided to the process.

(b) Recovery of heat from shaft furnace effluent gas for the production of steam for use in the reformer and for supply of reboiler duty on the $CO_2$ removal system. In addition, heat is recovered subsequent to the steam generation by preheating the recycle gas out of the $CO_2$ removal system. The conventional process does not recover this heat but uses a venturi scrubber to cool the gas. This additional heat recovery improves the overall energy efficiency of the process. Additionally, this may free up equivalent recoverable heat in the primary reformer convection section which in turn could make possible the preheating of combustion air to the primary reformer furnace.

(c) Separation of heavier constituents from natural gas for use as a feedstock for soot generation and to reduce the possibility of thermal cracking in the preheat coils, the primary reformer, and the autothermal or secondary reformer. Additionally, the use of the heavier hydrocarbons and oxygen in the soot generator produces an effluent gas which is a higher "R" value reducing gas. This idea is optional, applicable only when the feed natural gas contains appreciable amounts of $C_3$ and heavier hydrocarbons. The specific feed natural gas assumed for the processing scheme of FIG. 1 contained 14% $C_2$ through $C_6$ hydrocarbons which are believed to pose a major concern for carbon deposition on the reforming catalyst at the prevailing low "steam to carbon" ratio of 1.3. It is believed that without the presence of these heavier hydrocarbons, the carbon deposition tendency is reduced. Also, it would be easier to make the required soot, perhaps at higher yields as well, from the recovered hydrocarbons rather than from the natural gas feed. Any excess recovered hydrocarbons can be used as plant fuel, or sold. Also, due to improved "R" to shaft furnace, higher utilization and consequently a smaller recycle system are possible.

(d) Use of pure oxygen in place of oxygen enriched air to generate a synthesis gas stream containing soot. This is specific to the DRI process application.

Use of 99.5 mole % pure oxygen for soot making eliminates $N_2$ that would otherwise be present in the oxygen enriched air. Elimination of $N_2$ results in reduced sensible heat loss for heating large quantities of $N_2$, improved concentrations and reduced flow rates due to reduced inerts in the system.

Further, the overall DRI plant purge requirements are lowered since the amount of inerts ($N_2$) entering the system via the soot generation system are lowered. All these factors lead to an improved "R" value of the shaft furnace feed gas.

(e) Optimization of flows and conditions to reduce plant size, increase shaft furnace gas utilization per pass, and reduce purge.

These five features result in a more cost effective processing scheme having substantially lower capital and operating costs than the conventional processing schemes. As a matter of fact, comparing the process of the present invention to the process of FIG. 1, the present invention process results in a 52% smaller primary reformer, a 19% smaller $CO_2$ removal unit and a 33% smaller recycle heater. In addition the process of the present invention requires about 2.3 gigacalories of energy to produce one metric ton of sponge iron. The process according to FIG. 1 requires approximately 2.6 gigacalories of energy to produce one metric ton of sponge iron. Therefore, the process of the present invention uses 11.5% less energy than the process of FIG. 1; an 11.5% reduction in the energy consumption is considered significant in the art.

The present invention has been described with reference to a preferred embodiment thereof. However, this embodiment should not be considered a limitation on the scope of the invention, such scope should be ascertained by the following claims.

We claim:

1. A process for the direct production of iron ore to produce sponge iron comprising:
 (a) reforming a first essentially sulfur-free natural gas stream with steam in a steam-methane type primary reformer to produce a primary reformer effluent, wherein the steam to total carbon ratio entering the reformer is maintained at an effective level so as to prevent the formation of carbon;
 (b) further reforming the primary reformer effluent along with a second essentially sulfur-free natural gas stream and an oxygen stream in a oxygen type secondary reformer thereby producing a secondary reformer effluent having an "R" value of greater than 9.5 and a $H_2+CO$ concentration of at least 80 mole percent;
 (c) partially oxidizing a hydrocarbon stream with an oxygen stream thereby producing soot and a soot generator off-gas stream;

(d) combining the secondary reformer effluent with the soot, the soot generator off-gas stream and an essentially $CO_2$-free shaft furnace recycle stream thereby producing a total reducing gas stream;

(e) contacting the total reducing gas countercurrently with a descending bed of iron ore in a shaft furnace wherein the iron ore is reduced thereby producing sponge iron and the reducing gas is substantially converted to water ($H_2O$) and carbon dioxide ($CO_2$) and removed as a shaft furnace off-gas;

(f) cooling the shaft furnace off-gas thereby condensing out a major portion of the formed water and removing said condensed water from the shaft furnace off-gas stream;

(g) purging a portion of the cooled, dried shaft furnace off-gas;

(h) compressing the remainder of the shaft furnace off-gas and removing $CO_2$ from the compressed reducing gas in a $CO_2$ removal system thereby producing the essentially $CO_2$-free shaft furnace recycle stream; and (i) heating the essentially $CO_2$-free recycle stream and recycling the heated essentially $CO_2$-free recycle stream according to step (d).

2. A process for the direct production of iron ore to produce sponge iron comprising:

(a) processing a natural gas feed stream, the natural gas feed stream comprising $C_3$ and heavier hydrocarbons and sulfur compounds, to recover any $C_3$ and heavier hydrocarbons thereby producing a purified natural gas stream and a heavy hydrocarbon stream;

(b) desulfurizing said purified natural gas stream and splitting said desulfurized, purified natural gas stream into a first essentially sulfur-free natural gas stream and a second essentially sulfur-free natural gas stream;

(c) reforming the first essentially sulfur-free natural gas stream with steam in a steam-methane type primary reformer to produce a primary reformer effluent, wherein the steam to total carbon ratio entering the reformer is maintained at an effective level so as to prevent the formation of carbon;

(d) further reforming the primary reformer effluent along with the second essentially sulfur-free natural gas stream and an oxygen stream in an oxygen type secondary reformer thereby producing a secondary reformer effluent having an "R" value of greater than 9.5 and a $H_2+CO$ concentration of at least 80 mole percent;

(e) partially oxidizing at least a portion of said heavy hydrocarbon stream with an oxygen stream thereby producing soot and a soot generator off-gas stream;

(f) combining the secondary reformer effluent with the soot, the soot generator off-gas stream and an essentially $CO_2$-free shaft furnace recycle stream thereby producing a total reducing gas stream;

(g) contacting the total reducing gas countercurrently with a descending bed of iron ore in a shaft furnace wherein the iron ore is reduced thereby producing sponge iron and the reducing gas is substantially converted to water ($H_2O$) and carbon dioxide ($CO_2$) and removed as a shaft furnace off-gas;

(h) cooling the shaft furnace off-gas thereby condensing out a major portion of the formed water and removing said condensed water from the shaft furnace off-gas stream.

* * * * *